United States Patent
Liao et al.

(10) Patent No.: US 10,965,840 B2
(45) Date of Patent: Mar. 30, 2021

(54) DISPLAY AND COLOR CORRECTION METHOD

(71) Applicant: Qisda Corporation, Taoyuan (TW)

(72) Inventors: Chun-Hsiang Liao, Taoyuan (TW); Chin-Sheng Lin, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 168 days.

(21) Appl. No.: 16/169,847

(22) Filed: Oct. 24, 2018

(65) Prior Publication Data

US 2019/0132489 A1    May 2, 2019

(30) Foreign Application Priority Data

Oct. 27, 2017   (CN) .......................... 2017 1 1057025

(51) Int. Cl.
| | |
|---|---|
| G09G 3/34 | (2006.01) |
| H04N 1/60 | (2006.01) |
| H04N 9/74 | (2006.01) |
| G02F 1/13357 | (2006.01) |
| G09G 3/20 | (2006.01) |
| G09G 5/00 | (2006.01) |
| G09G 5/02 | (2006.01) |
| G09G 3/00 | (2006.01) |
| H04N 1/40 | (2006.01) |
| G09G 5/10 | (2006.01) |

(52) U.S. Cl.
CPC ..... *H04N 1/6086* (2013.01); *G02F 1/133606* (2013.01); *G09G 3/006* (2013.01); *G09G 3/2003* (2013.01); *G09G 3/3406* (2013.01); *G09G 5/006* (2013.01); *G09G 5/026* (2013.01); *G09G 5/10* (2013.01); *H04N 1/40006* (2013.01); *H04N 1/6083* (2013.01); *H04N 9/74* (2013.01); *G09G 3/3426* (2013.01); *G09G 2320/0242* (2013.01); *G09G 2320/043* (2013.01); *G09G 2320/0693* (2013.01); *G09G 2360/145* (2013.01); *G09G 2360/16* (2013.01)

(58) Field of Classification Search
None
See application file for complete search history.

(56) References Cited

U.S. PATENT DOCUMENTS

| | | | |
|---|---|---|---|
| 2007/0171217 A1* | 7/2007 | Tsai | G09G 3/3406 345/207 |
| 2016/0111048 A1* | 4/2016 | Matsui | H05B 45/10 315/151 |

\* cited by examiner

*Primary Examiner* — Roy P Rabindranath (57) ABSTRACT

A display and a color correction method are disclosed. The display includes a panel and a backlight module. The color correction method includes steps of: (a) sensing a real-time backlight intensity of the backlight module; (b) increasing a backlight intensity of the backlight module when the real-time backlight intensity is different from a standard backlight intensity of the backlight module; (c) sensing a compensated backlight intensity of the backlight module and estimating a first real-time color information of the panel according to the compensated backlight intensity and a first panel color characteristic information, wherein the first panel color characteristic information corresponds to the penetration characteristics of the panel; and (d) estimating a first color gain compensation value for the panel according to the first real-time color information and compensating the colors displayed on the panel when the panel displaying an image according to the first color gain compensation value.

16 Claims, 5 Drawing Sheets

DISPLAY AND COLOR CORRECTION METHOD

BACKGROUND OF THE INVENTION

1. Field of the Invention

The invention relates to color correction; in particular, to a display and a color correction method applied to the display.

2. Description of the Prior Art

The backlight emitted by the backlight module in the display is often affected by aged factors such as driving current or long-term use causing degradation. Brightness and chrominance of the panel may be also changed and deviated. When a person watches the aged display, he may feel that the color performance of the display is deteriorated.

Although the current display can correct the display color by an external colorimeter measuring the gray level and the color information of three primary colors in front of the panel. However, it is time-consuming and complicated for general users, and whether its color correction effect is good or not usually depends on the accuracy of the external colorimeter itself. Therefore, the current color correction method is still difficult to provide a good and stable color correction effect, which needs to be overcome.

SUMMARY OF THE INVENTION

Therefore, the invention provides a display and a color correction method applied to the display to overcome the above-mentioned problems in the prior art.

An embodiment of the invention is a color correction method. In this embodiment, the color correction method is applied to a display. The display includes a panel and a backlight module. The color correction method includes steps of: (a) sensing a real-time backlight intensity of the backlight module; (b) increasing a backlight intensity of the backlight module when the real-time backlight intensity is different from a standard backlight intensity of the backlight module; (c) sensing a compensated backlight intensity of the backlight module and estimating a first real-time color information of the panel according to the compensated backlight intensity and a first panel color characteristic information, wherein the first panel color characteristic information corresponds to the penetration characteristics of the panel; and (d) estimating a first color gain compensation value for the panel according to the first real-time color information and compensating the colors displayed on the panel when the panel displaying an image according to the first color gain compensation value.

In this embodiment, when the display is in a factory before sale, the first panel color characteristic information is generated by steps of: (e1) sensing a first color information of the panel in front of the panel when the backlight module emits a first backlight to the panel; (e2) sensing a second color information of the panel in front of the panel when the backlight module emits a second backlight to the panel, wherein the first backlight and the second backlight have different backlight intensities respectively; and (e3) estimating the first panel color characteristic information according to the first backlight, the first color information, the second backlight and the second color information.

In an embodiment, the color correction method further includes steps of: providing a colorimeter in front of the panel; and the colorimeter measuring intensity values of pure white, pure red, pure blue and pure green on the panel when the backlight module emits backlights having different backlight intensities to the panel.

In an embodiment, the intensity values of pure red, pure blue and pure green on the panel measured by the colorimeter are a product of the first panel color characteristic information and the backlight intensity of the backlight module.

In an embodiment, the step (e3) further includes a step of estimating the first panel color characteristic information according to interpolation method.

In an embodiment, the first panel color characteristic information is a feature matrix and the first panel color characteristic information includes correspondence between the color information of the panel and the backlight intensity of the backlight module.

In an embodiment, the step (b) further includes steps of: estimating a second real-time color information of the panel according to the first panel color characteristic information, the real-time backlight intensity and the standard backlight intensity; estimating a second color gain compensation value for the panel and a first lightness variation corresponding to the second color gain compensation value according to the second real-time color information; and increasing the backlight intensity of the backlight module according to the first lightness variation.

In an embodiment, the step (b) further includes a step of: increasing the backlight intensity of the backlight module according to a difference between the standard backlight intensity and the real-time backlight intensity.

In an embodiment, the step (b) further includes a step of: sensing a compensated real-time backlight intensity of the backlight module and using the compensated real-time backlight intensity to replace the standard backlight intensity.

In an embodiment, the color correction method further includes steps of: repeating the steps (e1)~(e3) to obtain a second panel color characteristic information after the display is used for a long time; and using the second panel color characteristic information to replace the first panel color characteristic information.

Another embodiment of the invention is a display. In this embodiment, the display includes a panel, a backlight module, a first sensing unit and a processing module. The backlight module is used for emitting a backlight to the panel. The first sensing unit is disposed at a side of the backlight module and used for sensing a real-time backlight intensity of the backlight module. The processing module is coupled to the panel, the backlight module and the first sensing unit respectively. When the real-time backlight intensity is different from a standard backlight intensity of the backlight module, the processing module increasing a backlight intensity of the backlight module. Then, the first sensing unit senses a compensated backlight intensity of the backlight module, the processing module estimates a first real-time color information of the panel according to the compensated backlight intensity and a first panel color characteristic information, wherein the first panel color characteristic information corresponds to penetration characteristics of the panel, the processing module estimates a first color gain compensation value for the panel according to the first real-time color information and compensates colors displayed on the panel according to the first color gain compensation value, and then the panel displays an image.

Compared to the prior arts, when the real-time backlight intensity of the backlight module is different from the standard backlight intensity, the display and the color correction method of the invention can increase the intensity of the backlight emitted by the backlight module and estimate the real-time color information of the panel according to the three tristimulus values of the compensated backlight intensity of the backlight module and the panel color characteristic information internally, and then the display and the color correction method of the invention estimate the color gain compensation value necessary for the panel accordingly and compensate the colors displayed on the panel through the color gain compensation value and then the panel displays image.

By doing so, even if the brightness and the chrominance in front of the panel deviate from the original normal color performance because the backlight emitted by the backlight module changes, the invention can detect the change of the backlight emitted by the backlight module and activate the backlight compensation mechanism immediately and the invention can also estimate the color gain compensation value necessary for the panel according to the compensated backlight intensity and the panel characteristic information to compensate the color of the panel. Therefore, the color attenuation of the backlight module can be effectively compensated, and the brightness and chrominance in front of the panel can be maintained in the original normal color performance, so that the human eye can have a more comfortable feeling when viewing the display.

The advantage and spirit of the invention may be understood by the following detailed descriptions together with the appended drawings.

DETAILED DESCRIPTION OF THE INVENTION

A preferred embodiment of the invention is a display. In this embodiment, the display has color correction function to maintain the lightness and chrominance in front side of the display in normal color performance, so that the color of the image displayed by the display can be maintained highly similar to the standard color, and the user will not see the color-shifted image due to aging of the component of the display.

Figure 1:
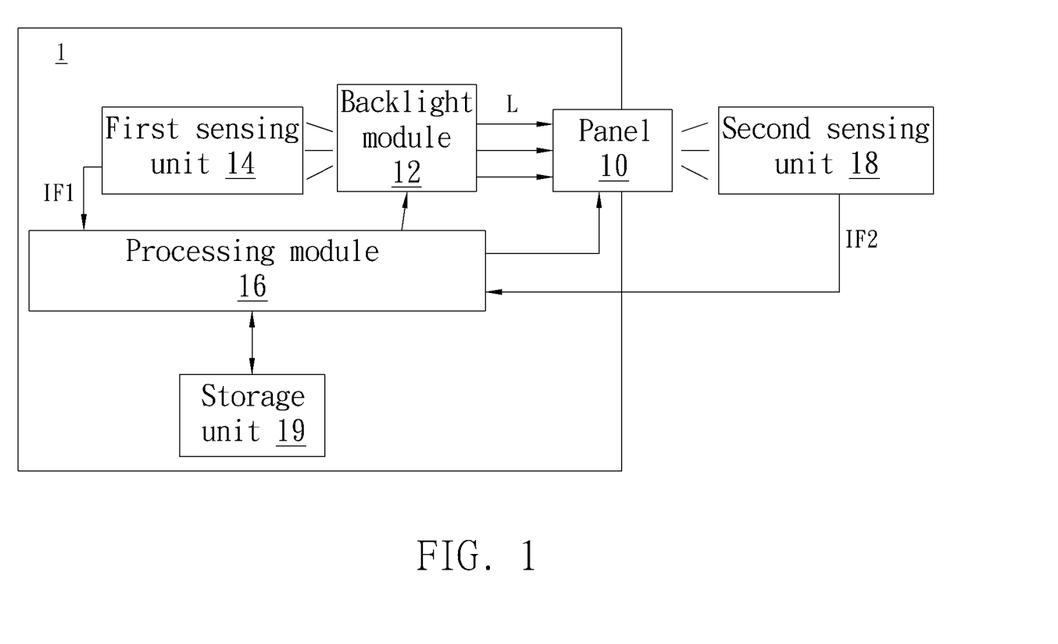
FIG. 1 illustrates a functional block diagram of the display in an embodiment of the invention.

Please refer to FIG. 1. FIG. 1 illustrates a functional block diagram of the display in this embodiment. As shown in FIG. 1, the display 1 includes a panel 10, a backlight module 12, a first sensing unit 14, a processing module 16, a second sensing unit 18 and a storage unit 19. The processing module 16 is coupled to the panel 10, the backlight module 12, the first sensing unit 14, the second sensing unit 18 and the storage unit 19 respectively. The first sensing unit 14 can be disposed at a side of the backlight module 12 and used for sensing the intensity value and the chrominance value of the lights emitted by the backlight module 12; the second sensing unit 18 can be disposed in front of the panel 10 and used for sensing the intensity value and the chrominance value of the lights emitted by the panel 10. The original data sensed by the second sensing unit 18 can be processed by the external processor and then transmitted to the processing module 16 through the input interface (not shown in the figure) of the display 1 or the original data sensed by the second sensing unit 18 can be also directly transmitted to the processing module 16 through the input interface of the display 1.

In practical applications, the panel 10 can be any panel capable of displaying image, such as the liquid crystal display panel, but not limited to this; the processing module 16 can be any processor capable of processing data, such as the microcontroller, but not limited to this; the storage unit 19 can be any memory capable of storing data, such as the random access memory (RAM) or the read-only memory (ROM), but not limited to this; the first sensing unit 14 and the second sensing unit 18 can be any light sensors capable of sensing the brightness and the chrominance of the light.

In this embodiment, the backlight module 12 is used to emit a backlight L to the panel 10. The first sensing unit 14 is used to sense a real-time backlight intensity IF1 of the backlight L emitted by the backlight module 12 and then transmit the real-time backlight intensity IF1 to the processing module 16. When the processing module 16 receives the real-time backlight intensity IF1 of the backlight module 12 sensed by the first sensing unit 14, the processing module 16 can compare the real-time backlight intensity IF1 of the backlight module 12 with a standard backlight intensity of the backlight module 12 to determine whether the backlight module 12 aged and the backlight emitted by the backlight module 12 changes and deviates from the standard backlight intensity.

In practical applications, the first sensing unit 14 can also sense a compensated real-time backlight intensity of the backlight module 12 and the processing module 16 can replace the original standard backlight intensity with the compensated real-time backlight intensity to achieve the purpose of updating and correcting the standard backlight intensity.

The real-time backlight intensity IF1 of the backlight module 12 sensed by the first sensing unit 14 and the color information IF2 in front of the panel 10 sensed by the second sensing unit 18 can have other representations due to different measuring instruments or measuring units and there are mathematical transformations between the representations, such as the three tristimulus values CIE 1931 XYZ or CIE1976 LAB of the three-dimensional vector or other color space representation capable of defining a color vector coordinate, but not limited to this.

When the processing module 16 determines that the real-time backlight intensity IF1 of the backlight module 12 is different from the standard backlight intensity or the real-time backlight intensity IF1 is lower than a default value, the processing module 16 will activate the backlight compensation mechanism immediately and increase the backlight intensity of the backlight L emitted by the backlight module 12. At the same time, the first sensing unit 14 will sense the compensated backlight intensity of the backlight module 12.

Then, the processing module 16 will estimate a first real-time color information of the panel 10 according to the compensated backlight intensity sensed by the first sensing unit 14 and a first panel color characteristic information corresponding to the panel 10. Afterward, the processing module 16 will estimate a first color gain compensation value necessary for the panel 10 according to the first real-time color information and compensate the colors displayed on the panel 10 when the panel 10 displays an image according to the first color gain compensation value.

In practical applications, the storage unit 19 can store the first panel color characteristic information corresponding to the panel 10. When the processing module 16 receives the compensated backlight intensity sensed by the first sensing unit 14, the processing module 16 can access the first panel color characteristic information from the storage unit 19 and estimate the first real-time color information of the panel 10 according to the first panel color characteristic information and the compensated backlight intensity. In addition, the storage unit 19 can also store a look-up table including the corresponding relationship between the color gain compensation value necessary for the panel 10 and the real-time color information of the panel 10, so that the processing module 16 can find the first color gain compensation value corresponding to the first real-time color information from the look-up table stored in the storage unit 19.

It should be noticed that, when the processing module 16 performs backlight compensation, it will increase the backlight intensity of the backlight module 12 over the standard backlight intensity. That is to say, the compensated backlight intensity sensed by the first sensing unit 14 will be larger than the standard backlight intensity. This is because the lightness of the panel 10 will be decreased when the processing module 16 performs color compensation on the panel 10 according to the first color gain compensation value. Therefore, the processing module 16 will increase the backlight intensity of the backlight module 12 over the standard backlight intensity in advance to achieve the effect of lightness pre-compensation.

In practical applications, the first panel color characteristic information corresponding to the panel 10 can be a feature matrix and can also include the correspondence (e.g., the non-linear correspondence) between the color information of the panel 10 and the backlight intensity of the backlight module 12, but not limited to this. Interpolation can be used between different measurement sampling points to obtain the relative relationship of the unmeasured points. The first panel color characteristic information corresponding to the panel 10 can be generated in the following manner, but is not limited thereto. In addition, the first panel color characteristic information corresponds to the penetration characteristic of the panel 10, that is to say, if the lights emitted by the backlight source of the same light intensity penetrates different panels, there will be difference between the lightness and color measured on the other side of different panels, mainly due to the differences in materials or processes.

When the display 1 is shipped from the factory before sale, the second sensing unit 18 connects to the display 1 in advance for getting the first panel color characteristic information of the panel 10. The backlight module 12 can respectively emit backlights having different backlight intensities to the panel 10, and the second sensing unit 18 correspondingly senses the color information IF2 of the panel 10 in front of the panel 10 and transmits the color information IF2 of the panel 10 to the processing module 16. Then, the processing module 16 will calculate the first panel color characteristic information corresponding to the panel 10 according to different backlight intensities and the colors displayed by the panel 10 (such as white light, pure red, pure green, and pure blue) and the corresponding color information IF2.

For example, when the backlight module 12 emits the first backlight to the panel 10, the second sensing unit 18 senses the first color information of the panel 10 in front of the panel 10 and transmits the first color information of the panel 10 to the processing module 16. When the backlight module 12 emits the second backlight to the panel 10, the second sensing unit 18 senses the second color information of the panel 10 in front of the panel 10 and transmits the second color information of the panel 10 to the processing module 16. Wherein, the first backlight and the second backlight emitted by the backlight module 12 have different backlight intensities respectively. Then, the processing module 16 can calculate the first panel color characteristic information corresponding to the panel 10 according to the first backlight, the first color information, the second backlight and the second color information by using the interpolation method, but not limited to this. In the above measurement procedure, the images of pure white, pure red, pure green and pure blue are respectively transmitted to the panel 10 for the second sensing unit 18 to measure different lightness and chrominance respectively.

In practical applications, the second sensing unit 18 can include a colorimeter. When the backlight module 12 respectively emits backlights having different backlight intensities to the panel 10, the colorimeter in the second sensing unit 18 can measure the intensity values of the pure white, the pure red, the pure blue and the pure green displayed on the panel 10 in front of the panel 10, respectively.

In an embodiment, the intensity values of pure red, pure blue and pure green displayed on the panel 10 measured by the colorimeter in the second sensing unit 18 can be the product of the first panel color characteristic information corresponding to the panel 10 (e.g., the feature matrix) and the backlight intensity emitted by the backlight module 12, but not limited to this.

It is assumed that the intensity values of pure red, pure blue and pure green on the panel 10 measured by the colorimeter in the second sensing unit 18 are P, the backlight intensity of the backlight module 12 sensed by the first sensing unit 14 is Q and the first panel color characteristic information corresponding to the panel 10 is R, then P=Q*R.

Wherein, R is a feature matrix and P and Q are expressed in matrix form. In an embodiment, if $$R = \begin{pmatrix} C_{11} & C_{12} & C_{13} \\ C_{21} & C_{22} & C_{23} \\ C_{31} & C_{32} & C_{33} \end{pmatrix}, P = \begin{pmatrix} R_X & R_Y & R_Z \\ G_X & G_Y & G_Z \\ B_X & B_Y & B_Z \end{pmatrix}, Q = \begin{pmatrix} S_X & 0 & 0 \\ 0 & S_Y & 0 \\ 0 & 0 & S_Z \end{pmatrix},$$

then based on P=R*Q, it can be found that $$\begin{pmatrix} R_X & R_Y & R_Z \\ G_X & G_Y & G_Z \\ B_X & B_Y & B_Z \end{pmatrix} = \begin{pmatrix} C_{11} & C_{12} & C_{13} \\ C_{21} & C_{22} & C_{23} \\ C_{31} & C_{32} & C_{33} \end{pmatrix} * \begin{pmatrix} S_X & 0 & 0 \\ 0 & S_Y & 0 \\ 0 & 0 & S_Z \end{pmatrix},$$

but not limited to this.

That is to say, under the premise that the first panel color characteristic information (e.g., the characteristic matrix) R corresponding to the panel 10 is maintained, even if the backlight intensity Q of the backlight module 12 is changed to Q', the processing module 16 can still estimate the intensity values P' of the corresponding pure red, pure blue and pure green on the panel 10 according to the changed backlight intensity Q' and the unchanged first panel color characteristic information R, and the processing module 16 can add the intensity values of pure red, pure blue and pure green on the panel 10 to obtain the intensity value of pure white, but not limited to this.

As for the processing module 16 to improve the backlight intensity of the backlight module 12 for backlight compensation, the method may be different according to practical needs. Two different embodiments will be described below, but not limited thereto.

In an embodiment, the processing module 16 can estimate the second real-time color information of the panel 10 according to the real-time backlight intensity IF1 of the backlight module 12, the standard backlight intensity, and the first panel color characteristic information corresponding to the panel 10; then, the processing module 16 estimates the second color gain compensation value necessary for the panel 10 and the corresponding first lightness variation according to the second real-time color information; finally, the processing module 16 further increases the backlight intensity of the backlight module 12 according to the first lightness variation, so that the compensated backlight intensity of the backlight module 12 is greater than the standard backlight intensity to achieve the effect of pre-compensation.

In another embodiment, the processing module 16 can also directly increase the backlight intensity of the backlight module 12 according to the difference between the real-time backlight intensity IF1 of the backlight module 12 and the standard backlight intensity. In addition, the processing module 16 can also increase the backlight intensity of the backlight module 12 according to a sum of the above-mentioned difference and a fixed value, thereby compensating for the lightness error value caused by the subsequent coloring program.

It should be noted that the first color gain compensation value estimated by the processing module 16 according to the first real-time color information can include a first pure red gain compensation value, a first pure blue gain compensation value and a first pure green gain compensation value used to compensate for the colors of red, blue and green in the image transmitted to the panel 10 respectively.

Figure 2:
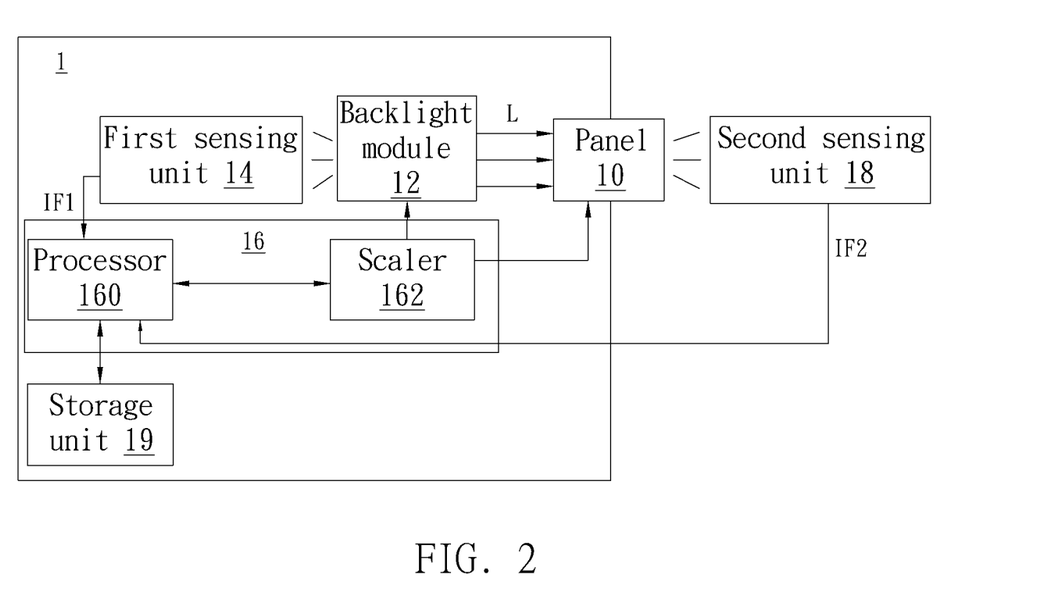
FIG. 2 illustrates a functional block diagram of the display in another embodiment of the invention.

In practical applications, as shown in FIG. 2, the processing module 16 can also include a processor 160 and a scaler 162. The processor 160 is coupled to the first sensing unit 14, the second sensing unit 18 and the storage unit 19 respectively and used for receiving the real-time backlight intensity IF1 of the backlight module 12 sensed by the first sensing unit 14 and the color information IF2 of the panel 10 sensed by the second sensing unit 18 respectively, and the real-time backlight intensity IF1 and the color information IF2 can be stored in the storage unit 19; the scaler 162 is coupled to the panel 10, the backlight module 12 and the processor 160 respectively and used to adjust the resolution of the image signal according to the native resolution of the panel 10 and to control the operation of the panel 10. In fact, the processor 160 and the scaler 162 can be integrated or independently set without any particular limitation.

Figure 3:
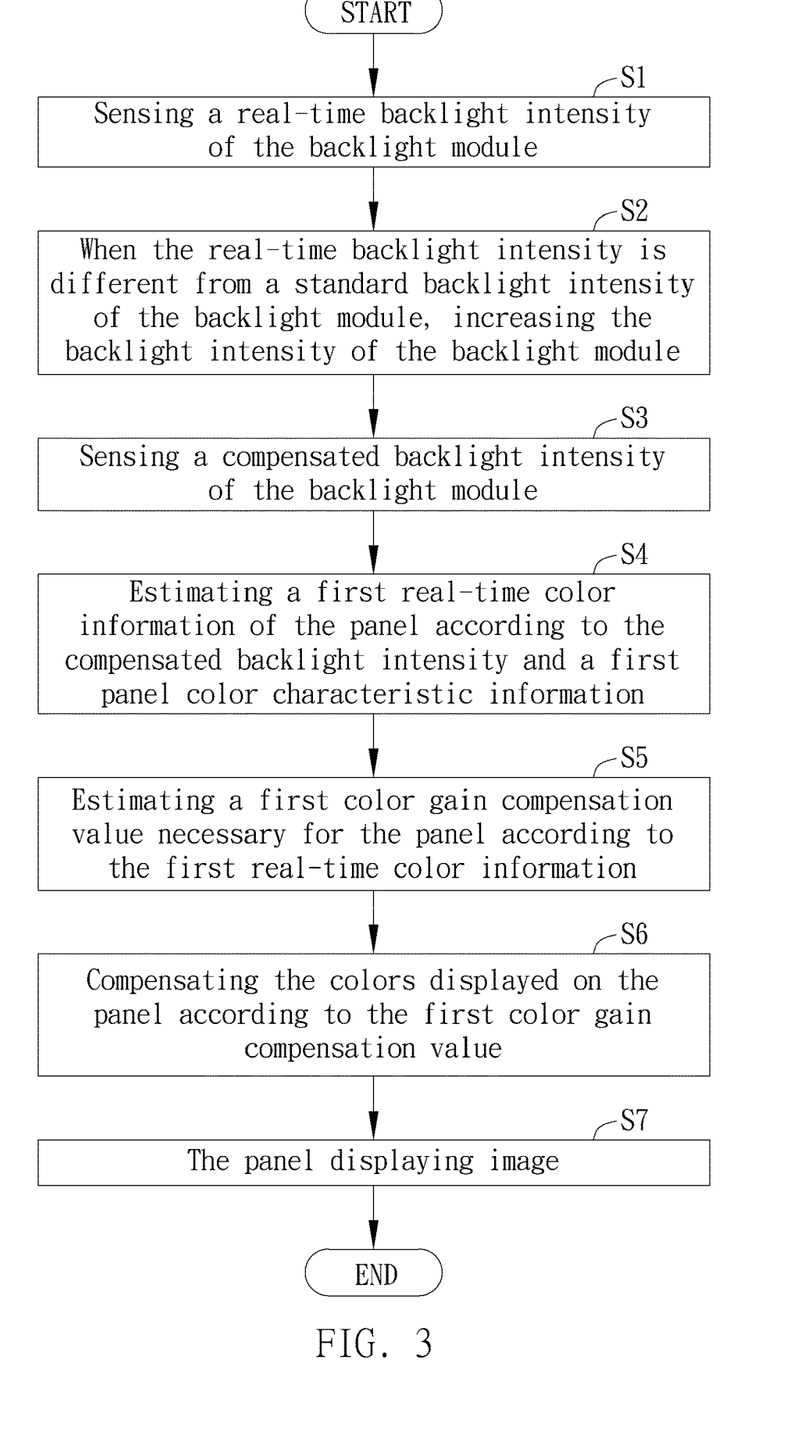
FIG. 3 illustrates a flowchart of the color correction method in another embodiment of the invention.

Another embodiment of the invention is a color correction method. In this embodiment, the color correction method is applied to a display. The display includes a panel and a backlight module. Please refer to FIG. 3. FIG. 3 illustrates a flowchart of the color correction method in this embodiment. As shown in FIG. 3, in this embodiment, the color correction method can include the following steps:

S1: sensing a real-time backlight intensity of the backlight module;

S2: when the real-time backlight intensity is different from a standard backlight intensity of the backlight module, increasing the backlight intensity of the backlight module;

S3: sensing a compensated backlight intensity of the backlight module;

S4: estimating a first real-time color information of the panel according to the compensated backlight intensity and a first panel color characteristic information;

S5: estimating a first color gain compensation value necessary for the panel according to the first real-time color information;

S6: compensating the colors displayed on the panel according to the first color gain compensation value, wherein the display signal is compensated by the first color gain compensation value before the display signal is transmitted to the panel; and S7: the panel displaying image.

In practical applications, the step S2 can estimate the second real-time color information of the panel according to the first panel color characteristic information, the real-time backlight intensity and the standard backlight intensity, and then estimate the second color gain compensation value necessary for the panel and the corresponding first lightness variation according to the second real-time color information, and finally increase the backlight intensity of the backlight module according to the first lightness variation.

In addition, the step S2 can directly increase the backlight intensity of the backlight module according to the difference between the standard backlight intensity and the real-time backlight intensity, or increase the backlight intensity of the backlight module according to a sum of the above-mentioned difference and a fixed value, thereby compensating for the lightness error value caused by the color adjustment performed in the subsequent step S6.

It should be noted that the real-time backlight intensity sensed in step S1 may be different kinds of parameters according to different instruments. For example, the tristimulus values (Sx, Sy, Sz) can be expressed as previously mentioned $$Q = \begin{pmatrix} S_X & 0 & 0 \\ 0 & S_Y & 0 \\ 0 & 0 & S_Z \end{pmatrix}.$$

However, to determine whether the backlight module is attenuated can use the measured value or the calculated value of white, red, green, blue or other color light is different from the standard value, but not limited to this.

In addition, the step S2 will compensate the backlight intensity of the backlight module to exceed the standard backlight intensity, so that the compensated backlight intensity sensed in step S3 will be greater than the standard backlight intensity. This is because the lightness of the panel will be decreased when the step S6 performs color compensation on the panel according to the first color gain compensation value. Therefore, the step S2 will increase the backlight intensity of the backlight module over the standard backlight intensity in advance to achieve the effect of lightness pre-compensation.

In practical applications, step S2 can also sense the compensated real-time backlight intensity of the backlight module and replace the original standard backlight intensity with the compensated real-time backlight intensity, thereby achieving the purpose of updating and calibrating the standard backlight intensity.

Figure 4A:
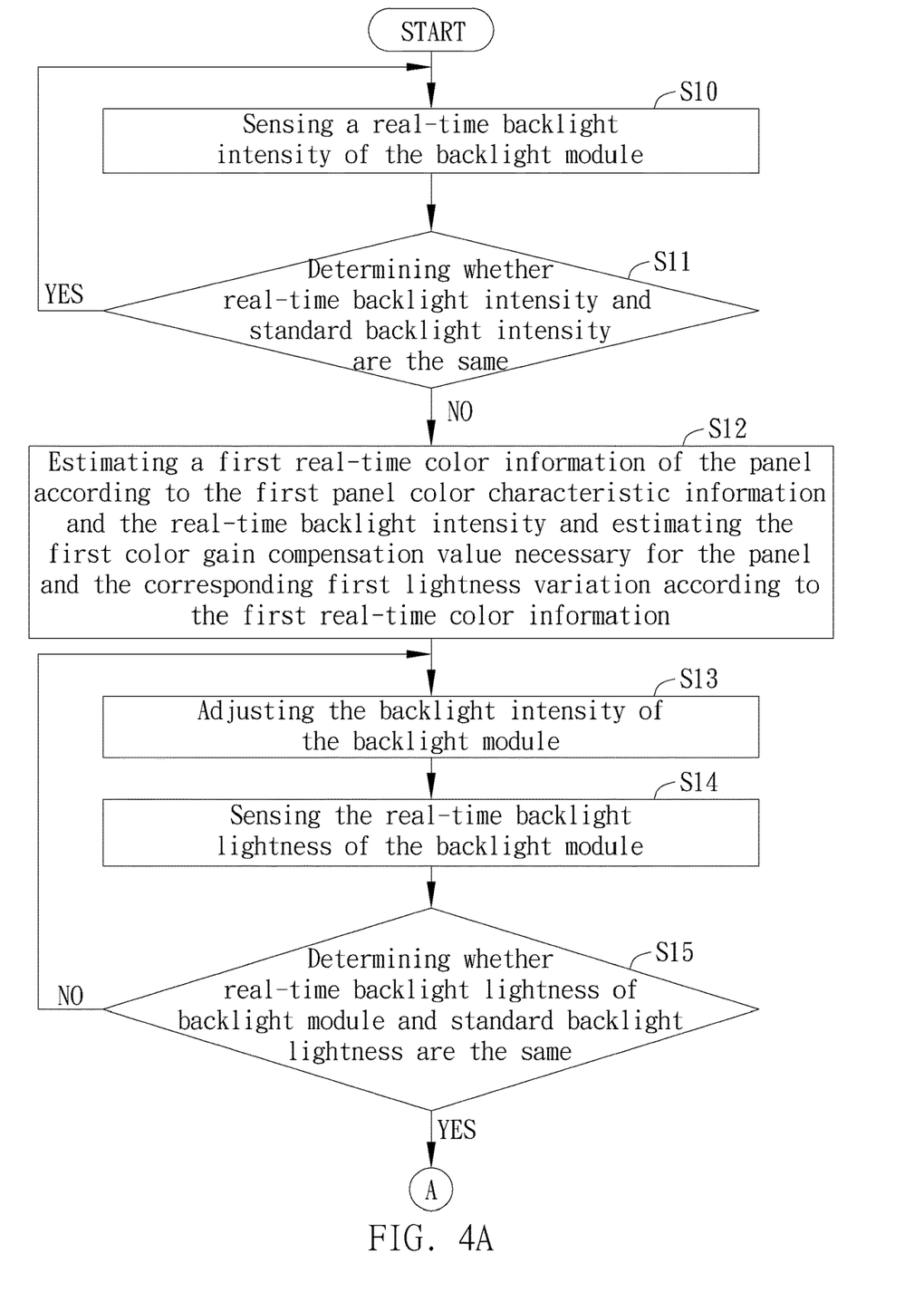
FIG. 4A and FIG. 4B illustrate a flowchart of the color correction method in another embodiment of the invention.
Figure 4B:
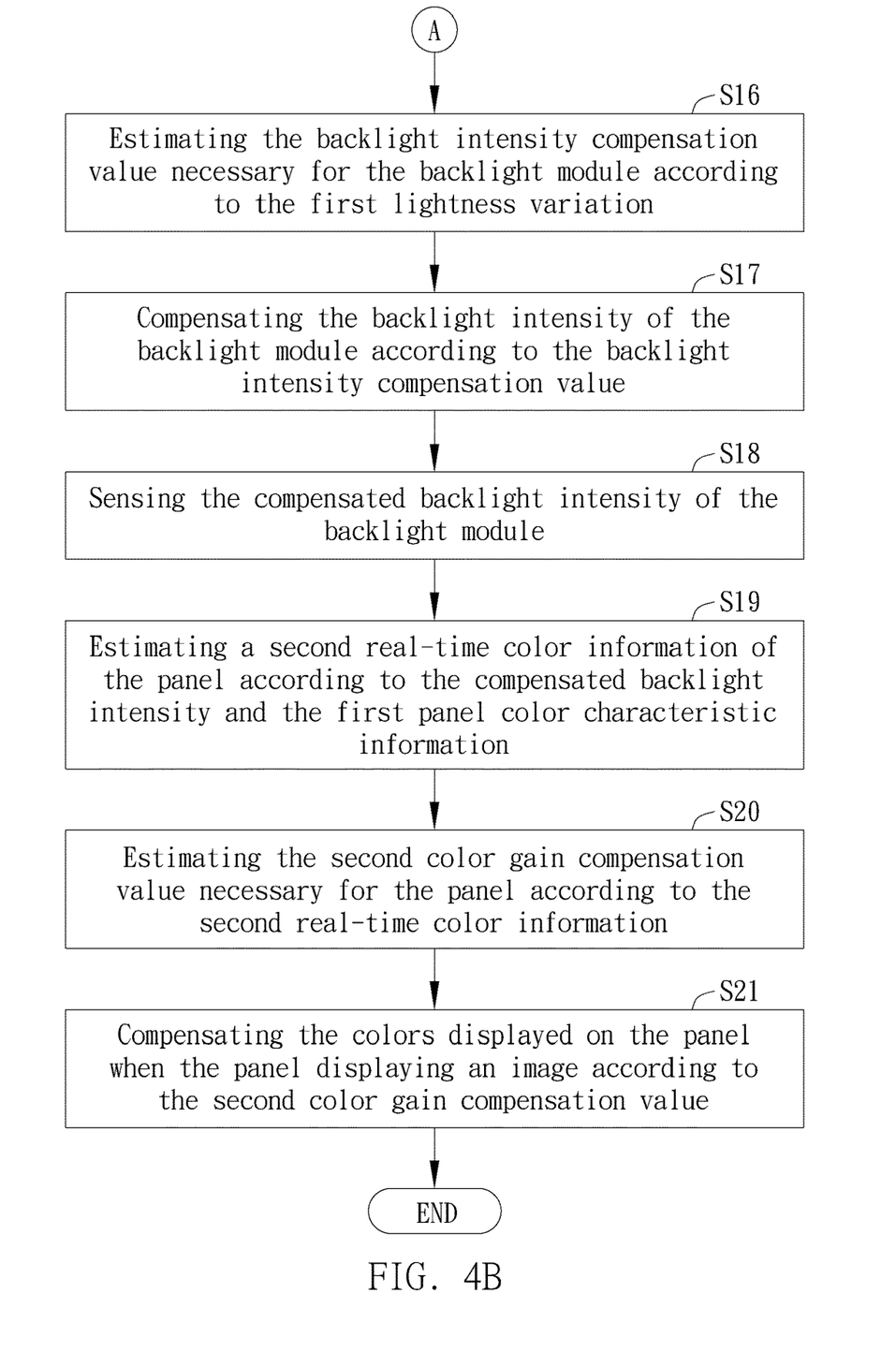

As shown in FIG. 4A and FIG. 4B. In another embodiment, the color correction method can include the following steps of:

S10: sensing a real-time backlight intensity of the backlight module;

S11: determining whether the real-time backlight intensity and a standard backlight intensity are the same, when the determination result of the step S11 is yes, performing the step S10 again;

S12: when the determination result of the step S11 is no, estimating a first real-time color information of the panel according to the first panel color characteristic information and the real-time backlight intensity and estimating the first color gain compensation value necessary for the panel and the corresponding first lightness variation according to the first real-time color information;

S13: adjusting the backlight intensity of the backlight module;

S14: sensing the real-time backlight lightness of the backlight module;

S15: determining whether the real-time backlight lightness of the backlight module and the standard backlight lightness are the same, when the determination result of the step S15 is no, performing the step S13 again;

S16: when the determination result of the step S15 is yes, estimating the backlight intensity compensation value necessary for the backlight module according to the first lightness variation;

S17: compensating the backlight intensity of the backlight module according to the backlight intensity compensation value;

S18: sensing the compensated backlight intensity of the backlight module;

S19: estimating a second real-time color information of the panel according to the compensated backlight intensity and the first panel color characteristic information;

S20: estimating the second color gain compensation value necessary for the panel according to the second real-time color information; and S21: compensating the colors displayed on the panel when the panel displaying an image according to the second color gain compensation value.

It should be noted that the first panel color characteristic information used in the step S12 and the step S19 can be a feature matrix, but not limited to this. The first real-time color information estimated by the step S12 according to the first panel color characteristic information and the real-time backlight intensity can be the first real-time intensity values of pure white, pure red, pure green and pure blue on the panel; the second real-time color information estimated by the step S19 according to the compensated backlight intensity and the first panel color characteristic information can be the second real-time intensity value of pure white, pure red, pure green and pure blue on the panel, but not limited to this.

Figure 5:
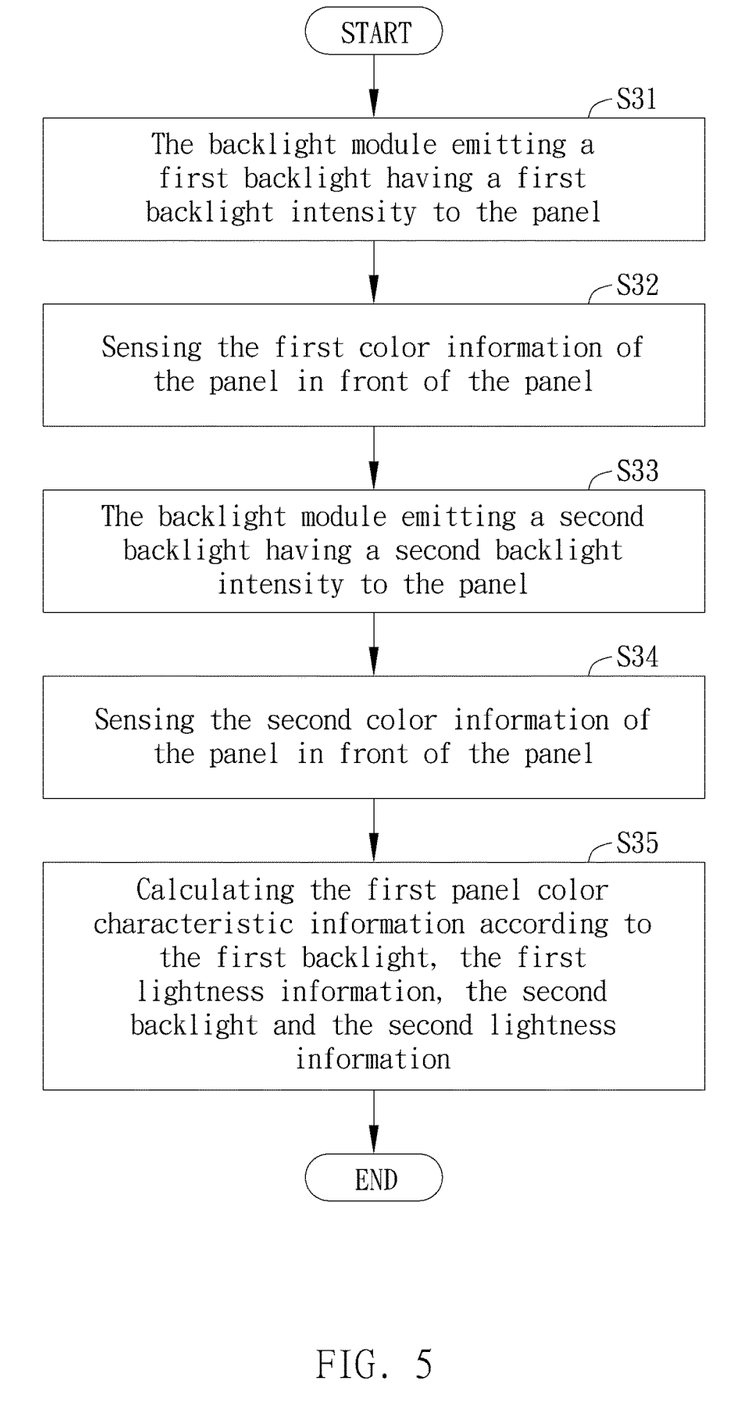
FIG. 5 illustrates a flowchart of generating the panel color characteristic information in an embodiment.

Next, please refer to FIG. 1 and FIG. 5. FIG. 5 illustrates a flowchart of the display 1 generating the panel color characteristic information in an embodiment of the invention.

When the display 1 is shipped from the factory, the backlight module 12 can sequentially emit a plurality of backlights having different backlight intensities to the panel 10, and the panel 10 displays images of pure white, pure red, pure green and pure blue, and the sensing unit 18 can sense measurement values of different backlight intensities and different displayed colors in front of the panel 10. For example, it is assumed that the backlight module 12 sequentially emits two backlights having different backlight intensities to the panel 10, when the backlight module 12 emits a first backlight having a first backlight intensity to the panel 10 and the panel 10 displays images of pure white, pure red, pure green and pure blue (the step S31 in FIG. 5), the second sensing unit 18 can sense the first color information of the panel 10 in front of the panel 10 (the step S32 in FIG. 5) and transmit the first color information to the processing module 16; when the backlight module 12 emits a second backlight having a second backlight intensity to the panel 10 and the panel 10 displays images of pure white, pure red, pure green and pure blue (the step S33 in FIG. 5), the second sensing unit 18 can sense the second color information emitted by the panel 10 in front of the panel 10 (the step S34 in FIG. 5) and transmit the second color information to the processing module 16. Then, the processing module 16 can calculate the first panel color characteristic information according to the first backlight, the first lightness information, the second backlight and the second lightness information (the step S35 in FIG. 5).

In practical applications, it is assumed that the backlight intensity emitted by the backlight module 12 can be divided into segments of backlight intensity. When the backlight module 12 emits the first backlight to the panel 10, the first sensing unit 14 senses that the first backlight emitted by the backlight module 12 has a first segment of backlight intensity of the segments of backlight intensity and transmits it to the processing module 16; at the same time, the second sensing unit 18 senses the first color information (e.g., the first real-time display chrominance) of the panel 10 and transmits it to the processing module 16. When the backlight module 12 emits the second backlight to the panel 10, the first sensing unit 14 senses that the second backlight emitted by the backlight module 12 has the second segment of backlight intensity of the segments of backlight intensity and transmits it to the processing module 16; at the same time, the second sensing unit 18 senses the second color information (e.g., the second real-time display chrominance) of the panel 10 and transmits it to the processing module 16.

When the processing module 16 receives the first segment of backlight intensity of the first backlight emitted by the backlight module 12, the first real-time display chrominance of the panel 10, the second segment of backlight intensity of the second backlight emitted by the backlight module 12 and the second real-time display chrominance of the panel 10, the processing module 16 can calculate the first segment of backlight intensity, the first real-time display chrominance, the second segment of backlight intensity and the second real-time display chrominance through an operation method (e.g., interpolation, but not limited to this) to obtain the first panel color characteristic information (e.g., the panel chrominance feature matrix, but not limited to this).

It should be noted that the color correction method can also provide a colorimeter in front of the panel. When the backlight module emits backlights with different backlight intensities to the panel, the colorimeter can measure the intensity values of pure white, pure red, pure blue and pure green on the panel, and the intensity values of pure red, pure blue and pure green on the panel measured by the colorimeter can be a product of the first panel color characteristic information and the backlight intensity emitted by the backlight module, but not limited to this. In practical applications, the first panel color characteristic information can be a feature matrix and the first panel color characteristic information can include a correspondence between the color information of the panel and the backlight intensities of the backlight module, but is not limited to this.

When the display 1 is used for a long period of time, the first panel color characteristic information originally used may be changed. Therefore, in the invention, the external color correction device can be used to cooperate with the first sensing unit 14 and the second sensing unit 18 in the display 1 to perform the steps S31~S35 in FIG. 5 again, and then the processing module 16 recalculates the second panel color characteristic information to update and replace the first panel color characteristic information originally stored in the storage unit 19.

Compared to the prior arts, when the real-time backlight intensity of the backlight module is different from the standard backlight intensity, the display and the color correction method of the invention can increase the intensity of the backlight emitted by the backlight module and estimate the real-time color information of the panel according to the three tristimulus values of the compensated backlight intensity of the backlight module and the panel color characteristic information, and then the display and the color correction method of the invention estimate the color gain compensation value necessary for the panel accordingly and compensate the colors displayed on the panel through the color gain compensation value and then the panel displays image.

By doing so, even if the lightness and chrominance in front of the panel deviate from the original normal color performance because the backlight emitted by the backlight module changes, the invention can detect the change of the backlight emitted by the backlight module and activate the backlight compensation mechanism immediately and the invention can also estimate the color gain compensation value necessary for the panel according to the compensated backlight intensity and the panel characteristic information to compensate the color of the panel. Therefore, the color attenuation of the backlight module can be effectively compensated, and the lightness and chrominance in front of the panel can be maintained in the original normal color performance, so that the human eye can have a more comfortable feeling when viewing the display.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A color correction method applied to a display, the display comprising a panel and a backlight module, the color correction method comprising steps of:
   (a) sensing a real-time backlight intensity of the backlight module;
   (b) increasing a backlight intensity of the backlight module when the real-time backlight intensity is different from a standard backlight intensity of the backlight module;
   (c) sensing a compensated backlight intensity of the backlight module and estimating a first real-time color information of the panel according to the compensated backlight intensity and a first panel color characteristic information, wherein the first panel color characteristic information corresponds to penetration characteristics of the panel; and
   (d) estimating a first color gain compensation value for the panel according to the first real-time color information and compensating colors displayed on the panel when the panel displaying an image according to the first color gain compensation value;
   wherein the first panel color characteristic information is generated by steps of:
   (e1) sensing a first color information of the panel in front of the panel when the backlight module emits a first backlight to the panel;
   (e2) sensing a second color information of the panel in front of the panel when the backlight module emits a second backlight to the panel, wherein the first backlight and the second backlight have different backlight intensities respectively; and
   (e3) estimating the first panel color characteristic information according to the first backlight, the first color information, the second backlight and the second color information.

2. The color correction method of claim 1, further comprising steps of:
   providing a colorimeter in front of the panel; and
   the colorimeter measuring intensity values of pure white, pure red, pure blue and pure green on the panel when the backlight module emits backlights having different backlight intensities to the panel.

3. The color correction method of claim 2, wherein the intensity values of pure red, pure blue and pure green on the panel measured by the colorimeter are a product of the first panel color characteristic information and the backlight intensity of the backlight module.

4. The color correction method of claim 1, wherein the step (e3) further comprises a step of:
   estimating the first panel color characteristic information according to an interpolation method.

5. The color correction method of claim 1, wherein the first panel color characteristic information is a feature matrix and the first panel color characteristic information comprises correspondence between the color information of the panel and the backlight intensity of the backlight module.

6. The color correction method of claim 1, wherein the step (b) further comprises steps of:
   estimating a second real-time color information of the panel according to the first panel color characteristic information, the real-time backlight intensity and the standard backlight intensity;
   estimating a second color gain compensation value for the panel and a first lightness variation corresponding to the second color gain compensation value according to the second real-time color information; and
   increasing the backlight intensity of the backlight module according to the first lightness variation.

7. The color correction method of claim 1, wherein the step (b) further comprises a step of:
   increasing the backlight intensity of the backlight module according to a difference between the standard backlight intensity and the real-time backlight intensity.

8. The color correction method of claim 1, wherein the step (b) further comprises a step of:
   sensing a compensated real-time backlight intensity of the backlight module and using the compensated real-time backlight intensity to replace the standard backlight intensity.

9. The color correction method of claim 1, further comprising steps of:
   repeating the steps (e1)-(e3) to obtain a second panel color characteristic information after the display is used for a time period; and
   using the second panel color characteristic information to replace the first panel color characteristic information.

10. A display, comprising:
    a panel;
    a backlight module, for emitting a backlight to the panel;

a first sensing unit, disposed at a side of the backlight module, for sensing a real-time backlight intensity of the backlight module; and a processing module, coupled to the panel, the backlight module and the first sensing unit respectively, when the real-time backlight intensity is different from a standard backlight intensity of the backlight module, the processing module increasing a backlight intensity of the backlight module;

wherein the first sensing unit further senses a compensated backlight intensity of the backlight module, the processing module estimates a first real-time color information of the panel according to the compensated backlight intensity and a first panel color characteristic information, wherein the first panel color characteristic information corresponds to penetration characteristics of the panel, the processing module estimates a first color gain compensation value for the panel according to the first real-time color information and compensates colors displayed on the panel when the panel displaying an image according to the first color gain compensation value, the first panel color characteristic information is a feature matrix and the first panel color characteristic information comprises correspondence between the color information of the panel and the backlight intensity of the backlight module.

11. The display of claim 10, further comprising:

a second sensing unit, disposed in front of the panel and coupled to the processing module;

wherein when the backlight module emits a first backlight to the panel, the second sensing unit senses a first color information of the panel in front of the panel; when the backlight module emits a second backlight to the panel, the second sensing unit senses a second color information of the panel in front of the panel, wherein the first backlight and the second backlight have different backlight intensities respectively, the processing module estimates the first panel color characteristic information according to the first backlight, the first color information, the second backlight and the second color information.

12. The display of claim 11, wherein the second sensing unit comprises a colorimeter, when the backlight module emits backlights having different backlight intensities to the panel, the colorimeter measures intensity values of pure white, pure red, pure blue and pure green in front of the panel.

13. The display of claim 11, wherein the processing module estimates the first panel color characteristic information according to interpolation method.

14. The display of claim 12, wherein the intensity values of pure red, pure blue and pure green on the panel measured by the colorimeter are a product of the first panel color characteristic information and the backlight intensity of the backlight module.

15. The display of claim 10, wherein when the real-time backlight intensity is different from a standard backlight intensity, the processing module estimates a second real-time color information of the panel according to the first panel color characteristic information, the real-time backlight intensity and the standard backlight intensity, and the processing module also estimates a second color gain compensation value for the panel and a first lightness variation corresponding to the second color gain compensation value according to the second real-time color information, and then the processing module increases the backlight intensity of the backlight module according to the first lightness variation.

16. The display of claim 10, wherein when the real-time backlight intensity is different from a standard backlight intensity, the processing module increases the backlight intensity of the backlight module according to a difference between the standard backlight intensity and the real-time backlight intensity.

* * * * *